US011178252B1

(12) United States Patent
Devta et al.

(10) Patent No.: US 11,178,252 B1
(45) Date of Patent: Nov. 16, 2021

(54) SYSTEM AND METHOD FOR INTELLIGENT DISTRIBUTION OF INTEGRATION ARTIFACTS AND RUNTIME REQUESTS ACROSS GEOGRAPHIC REGIONS

(71) Applicant: ORACLE INTERNATIONAL CORPORATION, Redwood Shores, CA (US)

(72) Inventors: Prakash Kumar Devta, Bangalore (IN); Srimant Misra, Bangalore (IN); Sandeep Deshpande, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/062,454

(22) Filed: Oct. 2, 2020

(51) Int. Cl.
| | | |
|---|---|---|
| *G06F 15/16* | (2006.01) | |
| *H04L 29/08* | (2006.01) | |
| *H04L 12/24* | (2006.01) | |
| *G06F 9/50* | (2006.01) | |
| *G06F 8/20* | (2018.01) | |

(52) U.S. Cl.
CPC ............... *H04L 67/34* (2013.01); *G06F 8/20* (2013.01); *G06F 9/5083* (2013.01); *H04L 41/5041* (2013.01); *H04L 67/101* (2013.01); *H04L 67/1008* (2013.01); *H04L 41/5096* (2013.01); *H04L 67/1095* (2013.01); *H04L 67/36* (2013.01)

(58) Field of Classification Search
CPC ... H04L 67/34; H04L 67/1008; H04L 67/101; H04L 41/5041

USPC .......................................................... 709/201
See application file for complete search history.

(56) References Cited

U.S. PATENT DOCUMENTS

| | | | |
|---|---|---|---|
| 10,079,877 B2* | 9/2018 | Paramasivam | ....... H04L 67/025 |
| 10,237,187 B2* | 3/2019 | Paramasivam | ....... G06F 9/5083 |
| 10,324,697 B2 | 6/2019 | Gravenites et al. | |
| 10,609,128 B2* | 3/2020 | Paramasivam | ....... H04L 67/025 |
| 10,630,529 B2* | 4/2020 | Vempati | .................. H04L 67/26 |
| 10,630,593 B2* | 4/2020 | Paramasivam | ......... H04L 47/24 |
| 2017/0230451 A1* | 8/2017 | Paramasivam | ......... H04L 67/22 |
| 2017/0317932 A1* | 11/2017 | Paramasivam | ....... H04L 47/125 |
| 2018/0191550 A1* | 7/2018 | Vempati | ................ H04W 76/45 |
| 2018/0359311 A1* | 12/2018 | Paramasivam | ......... H04L 67/28 |

(Continued)

OTHER PUBLICATIONS

"Amazon Elastic Compute Cloud: User Guide for Linux Instances", Amazon Web Services, 2020, retrieved from https://docs.aws.amazon.com/AWSEC2/latest/UserGuide/using-regions-availability-zones.html, 1253 pages.

(Continued)

*Primary Examiner* — Moustafa M Meky
(74) *Attorney, Agent, or Firm* — Tucker Ellis LLP

(57) ABSTRACT

Systems and methods for intelligent distribution of integration artifacts and runtime requests across geographic regions. Integration Platforms as a Service (iPaaS) are generally networks that span multiple, distinct geographic regions, where customers or tenants can have provisioned a service instance in one or more of these regions. In order to take advantage of the infrastructure presented in an iPaaS system that spans multiple geographic regions (also referred to herein as "regions") a connection configured in one service instance can be synchronized among other service instances in different regions.

20 Claims, 12 Drawing Sheets

(56) References Cited

U.S. PATENT DOCUMENTS

2019/0199637 A1\* 6/2019 Paramasivam ....... G06F 9/5083
2020/0099772 A1\* 3/2020 Ray ..................... G06F 9/44526

OTHER PUBLICATIONS

"Azure global infrastructure", Microsoft Azure, retrieved from https://azure.microsoft.com/en-in/global-infrastructure/ on Jun. 20, 2020, 9 pages.

"Cloud API and Application Integration", Informatica, retrieved from https://www.informatica.com/products/cloud-integration/cloud-application-integration.html on Jun. 20, 2020, 4 pages.

"Integration runtime in Azure Data Factory", Microsoft Docs, published on Mar. 26, 2020, retrieved from https://docs.microsoft.com/en-us/azure/data-factory/concepts-integration-runtime, 10 pages.

"Integration and iPaaS", Boomi AtomSphere, retrieved from https://help.boomi.com/bundle/integration/page/c-atm-Integration_and_iPaaS_257fcf2c-7e93-48d0-be67-bd53fb444930.html on Jun. 20, 2020, 2 pages.

Liu, et al., "Integration platform as a service: The next generation of ESH, Part 1", IBM Developer, published Jul. 20, 2015, retrieved from https://developer.ibm.com/depmodels/cloud/articles/cl-ipaas-next-generation-of-esb1/, 10 pages.

"MuleSoft Expands CloudHub to Become First Global Integration Platform as a Service", MuleSoft, published Jun. 26, 2013, retrieved from https://www.mulesoft.com/cloudhub-first-global-ipaas, 5 pages.

"Ultra-low-latency edge computing", Microsoft Azure, retrieved from https://azure.microsoft.com/en-in/solutions/low-latency-edge-computing/#faq on Jun. 20, 2020, 12 pages.

"What is iPaaS? Your 2020 Guide to Integration Platform as a Service", Informatica, retrieved from https://www.informatica.com/in/solutions/ipaas.html on Jun. 20, 2020, 4 pages.

\* cited by examiner

SYSTEM AND METHOD FOR INTELLIGENT DISTRIBUTION OF INTEGRATION ARTIFACTS AND RUNTIME REQUESTS ACROSS GEOGRAPHIC REGIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related integration cloud services, and in particular, systems and methods for intelligent distribution of integration artifacts and runtime requests across geographic regions.

BACKGROUND

Integration cloud services (ICS) (e.g., Oracle Integration Cloud Service) are simple and powerful integration platforms in the cloud that assist in the utilization of products, such as Software as a Service (SaaS) and on-premises applications. ICS can be provided as an integration platform as a service (iPaas) and can include a web-based integration designer for point and click integration between applications, a rich monitoring dashboard that provides real-time insight into the transactions.

SUMMARY

In accordance with an embodiment, systems and methods for supporting a distribution of integration artifacts and runtime requests across geographic regions are provided. Integration platform as a service (iPaaS) are generally networks that span multiple, distinct geographic regions, where customers or tenants can have provisioned a service instance in one or more of these regions. In order to take advantage of the infrastructure presented in an iPaaS system that spans multiple geographic regions (also referred to herein as "regions") a connection configured in one service instance can be synchronized among other service instances in different regions. This can enable test connections to target application from different regions and help calculate connectivity latency from these regions to target applications

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Integration platform as a service, for example, Oracle Integration Cloud Service (ICS), can provide a cloud-based platform for building and deploying integrations flows that connect applications residing in the cloud or on-premises.
Integration Cloud Service FIG. 1 illustrates an ICS platform for designing and executing an ICS integration flow, in according with an embodiment.

Figure 1:
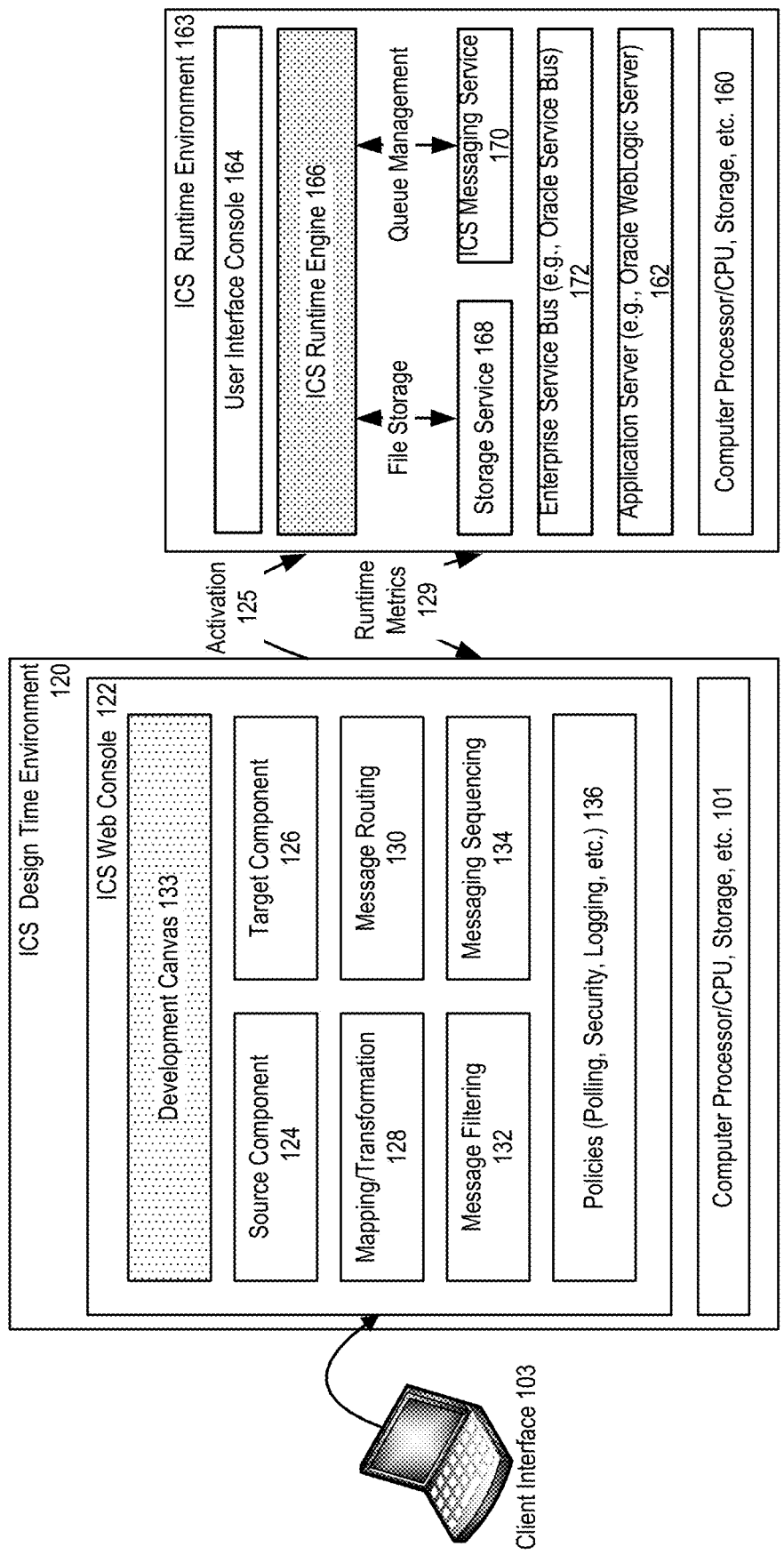
FIG. 1 illustrates an integration cloud service in accordance with an embodiment.

As shown in FIG. 1, the ICS platform can include a design-time environment 120, and a runtime environment 163. Each environment can execute on a computer including one or more processors, for example a computer 101 or 106.

In accordance with an embodiment, the design-time environment includes an ICS web console 122, which provides a browser-based designer to allow an integration flow developer to build integrations using a client interface 103.

In accordance with an embodiment, the ICS design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object. ICS can also support orchestration templates where there will be one trigger and many invoke interactions. Each invoke interaction is specific to an application. ICS can allow a user to create orchestration of applications with the help of adapter connections.

As further shown in FIG. 1, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order.

In accordance with an embodiment, each of the above of the described components, as with the source and target components, can include design-time settings that can be persisted as part of a flow definition/configuration.

In accordance with an embodiment, a flow definition specifies the details of an ICS integration flow; and encompasses both the static constructs of the integration flow (for example, message routers), and the configurable aspects (for example, routing rules). A fully configured flow definition and other required artifacts (for example, jca and .wsdl files) in combination can be referred to as an ICS project. An ICS project can fully define an integration flow, and can be implemented by an underlying implementation layer.

In accordance with an embodiment, a policies component 136 can include a plurality of policies that govern behaviors of the ICS environment. For example, a polling policy can be configured for source-pull messaging interactions (i.e. query style integrations) for a source application, to invoke an outbound call to the source application via a time-based polling.

In accordance with an embodiment, other policies can be specified for security privileges in routing messages to a target application; for logging message payloads and header fields during a flow execution for subsequent analysis via a monitoring console; and for message throttling used to define a number of instances that an enterprise service bus (ESB) service can spawn to accommodate requests. In addition, policies can be specified for monitoring/tracking an integration flow at a flow level; and for validating messages being processed by the ICS platform against a known schema.

In accordance with an embodiment, an integration developer can drag and drop a component on a development canvas 133 for editing and configuration, for use in designing an integration flow.

As further shown, the runtime environment can include an application server 162, an ICS runtime engine 166, a storage service 168 and a messaging service 170 on top of an enterprise service bus component 172. A user interface console 164 can be used to monitor and track performance of the runtime environment.

Figure 2:
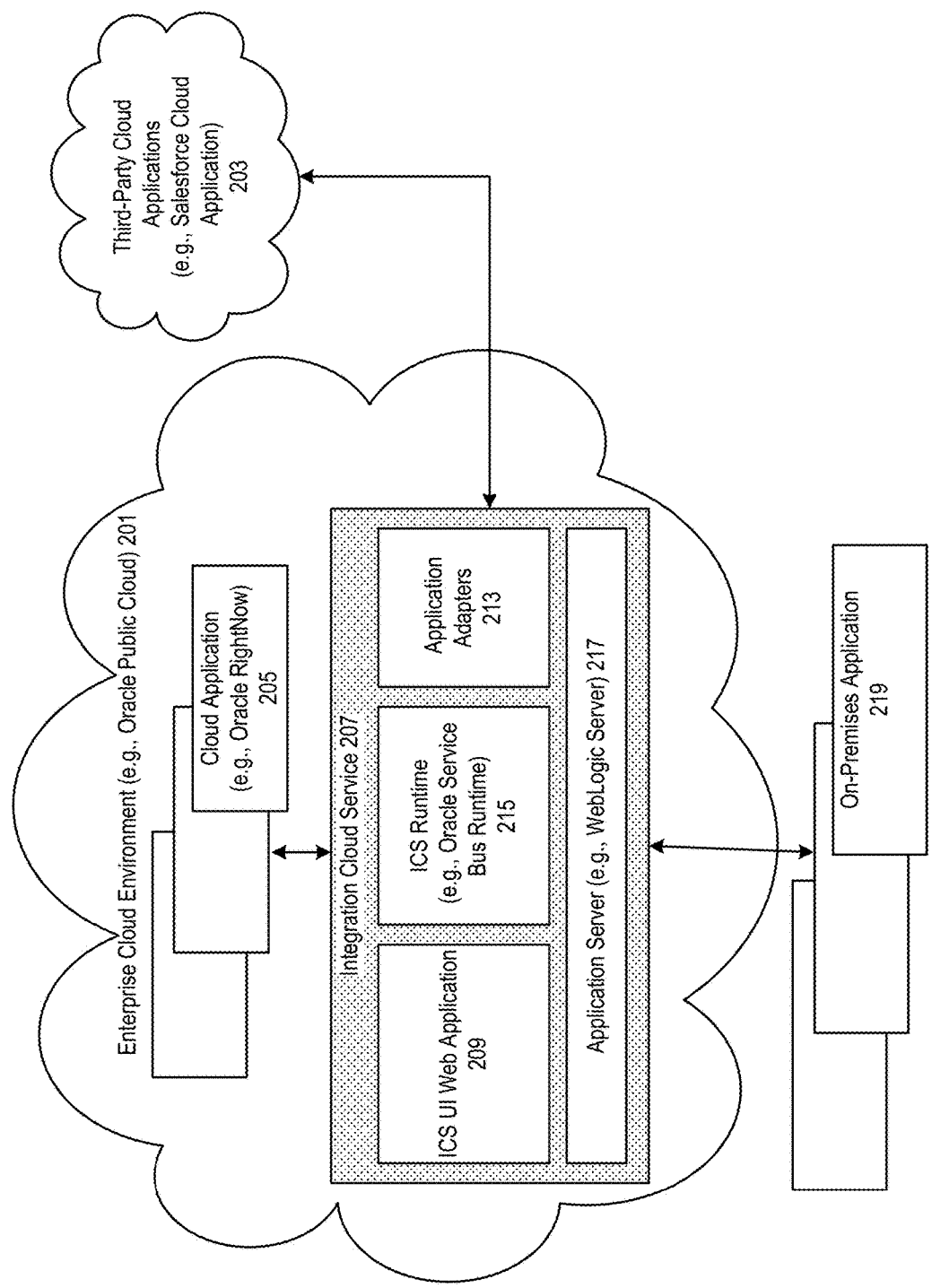
FIG. 2 illustrates an integration cloud service in accordance with an embodiment.

FIG. 2 illustrates an integration cloud service in accordance with an embodiment.

As shown in FIG. 2, an ICS 207 can provide a cloud-based integration service for designing, executing, and managing ICS integration flows. The ICS can include a web application 209 and an ICS runtime 215 executing on an application server 217 in an enterprise cloud environment (for example, Oracle Public Cloud) 201. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 213 can be provided to simplify the task of configuring connections to a plurality of applications, by handling the underlying complexities of connecting to those applications. The applications can include enterprise cloud applications of the ICS vendor 205, third-party cloud applications (for example, Salesforce) 103, and on-premises applications 219. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, orchestration integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service.

Figure 3A:
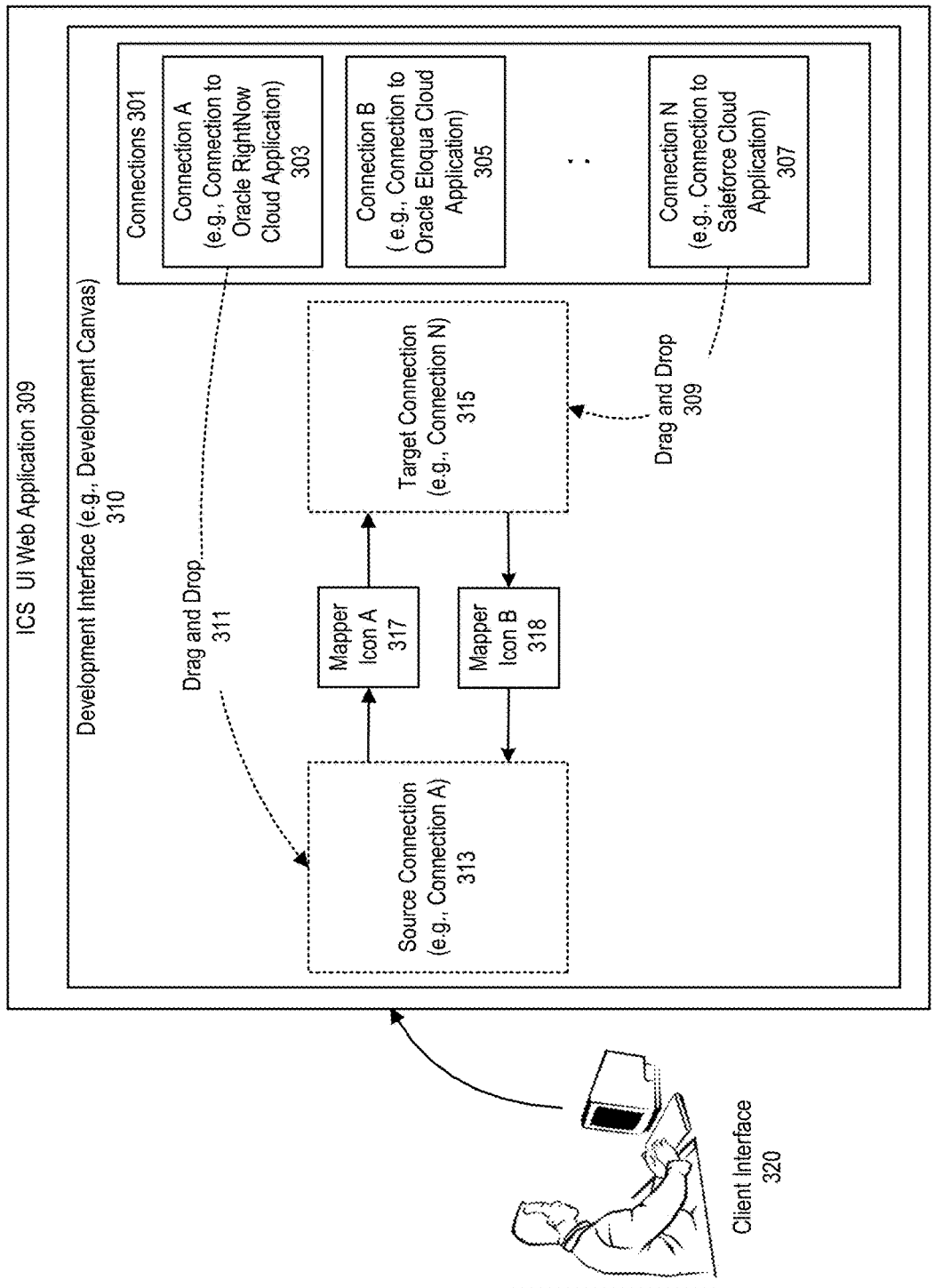
FIG. 3a illustrates an ICS design time, in accordance with an embodiment.

FIG. 3a illustrates an ICS design time, in accordance with an embodiment.

In accordance with an embodiment, a development interface (e.g., a development canvas) 310 in the web UI application can be used by a user 320 to create an ICS integration flow, using a plurality of existing connections 301, for example, connection A 303, connection B 305 and connection N 307.

As shown in FIG. 3a, a particular connection (for example, connection A) can be dragged and dropped 311 to the development interface as a source connection 313, and connection N can be dragged and dropped 309 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

Figure 3B:
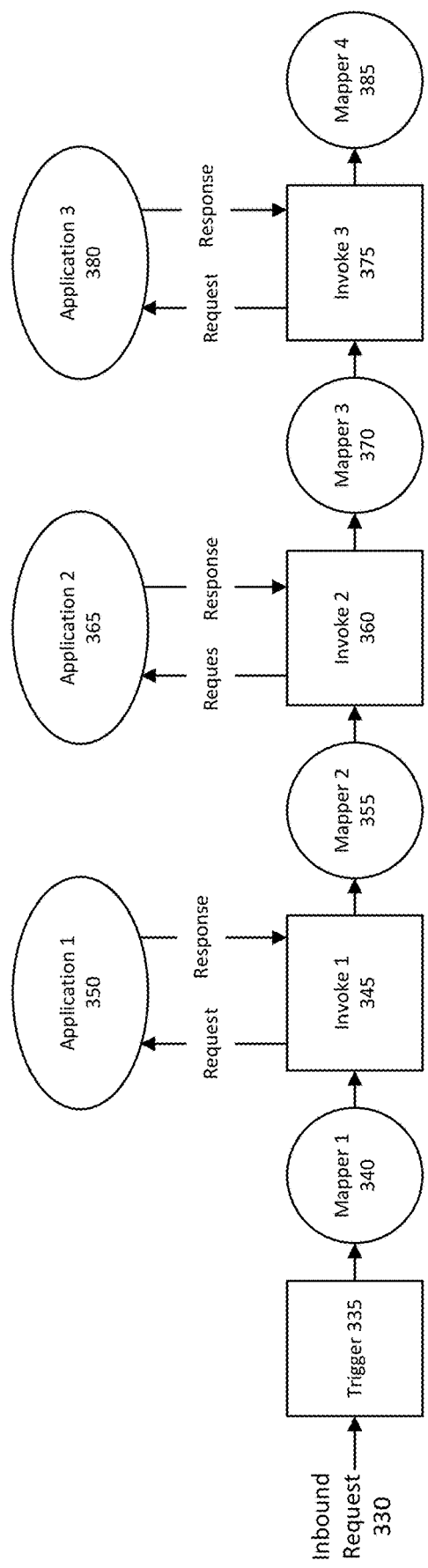
FIG. 3b shows an orchestration integration flow of applications in different geographic regions, in accordance with an embodiment.

FIG. 3b shows an orchestration integration flow of applications in different geographic regions, in accordance with an embodiment.

In accordance with an embodiment, an orchestration integration flow (i.e., orchestration of applications) can comprise a plurality of application adapters, such as invoke 1 345, invoke 2 360, and invoke 3 375. The orchestration integration flow can additionally comprise a number of mappers, such as mapper 1 340, mapper 2 355, mapper 3 370, and mapper 4 385, which each can map different sets of data, depending upon, e.g., the requirements of the application adapters.

In accordance with an embodiment, each application adapter (i.e., each invoke) can be associated with an external application (or an instance of an external application), such as application 1 350, application 2 365, and application 3 380.

In accordance with an embodiment, an inbound request 330 can trigger 335 the orchestration integration flow to run, or be tested for latency.

In accordance with an embodiment, as described above, each of the request response pairs between the invokes (application adapters) and the external applications can be associated with a latency which can be, in part, due to the geographic location of both the external application (e.g., the location of the servers hosting the external applications), as well as the location from which the integration flow is being executed. Put another way, because the provider of the integration flow is not necessarily also the provider of the external applications, there is generally some physical geographic distance between the servers from which the application flow is integration and the various external applications from which the request/response pairs are directed to.

Distribution of Integration Artifacts and Runtime Requests Across Geographic Regions In accordance with an embodiment, an integration platform as a service (iPaaS) generally can offer services in multiple geographical regions. Customers/tenants of iPaaS platforms can provision integration service instance(s) in one, some, or all of these regions, depending on the needs of the tenant/customer. Generally, customers select a single region in which to provision the integration service instance (the geographic region closest to, e.g., their office so as to reduce latency and improve connectivity).

In accordance with an embodiment, iPaaS platform providers don't synchronize integration artifacts across regions. Because of this, in typical iPaaS, this doesn't allow for the integration runtime to make the most out of the infrastructure investment.

In accordance with an embodiment, an integration of applications consists of multiple applications working together in an orchestration. Generally, the integration platform provides ways to interact with these applications with the help of client applications. These client applications are called connectors or adapters.

In accordance with an embodiment, a user/developer generally needs to configure connectivity/connection settings for these adapters, for example, a service URL, security policy, . . . etc.

In accordance with an embodiment, in order to take advantage of the infrastructure presented in an iPaaS system that spans multiple geographic regions (also referred to herein as "regions") a connection configured in one service instance can be synchronized among other service instances in different regions. This can be performed using various replication strategies available.

In accordance with an embodiment, at the time of validating the connection (also known as test connection), the integration service instances can check for TCP (transmission control protocol) connectivity and latency. For a single connection, this data will vary across regions.

In accordance with an embodiment, then, based on the connections involved in an integration, a calculation can be made for an overall latency for the integration. This can vary across geographic regions.

In accordance with an embodiment, at the time of activation of an integration flow, the integration platform can determine an optimum geographical location/region in which to run the integration when considering all the involved connections in the integration. This is done based on the overall latency calculated.

In accordance with an embodiment, if customer has multiple service instances, then such service instances can be grouped together in a composite service instance. The deployment of the artifact can take place in all the service instances which are part of the composite.

In accordance with an embodiment, integration platforms can attempt to serve the runtime from the optimum service instance most of the time. This is done with the help of a global load balancer. If the optimum service instance is overloaded, then the runtime will be executed from a different service instance (e.g., the next optimum service instance). Note that each service instance has multiple compute nodes or containers behind a local load balancer.

In accordance with an embodiment, in the composite, the deployment on optimum service instance can be active, this will use the computer resources of the infrastructure. Deployment to other service instances of the composite can be replaced by a simple proxy. This proxy will not consume compute resources and will bring up the runtime only when the request comes to a non-optimal service instance. Note: this is rare and will happen in a very high load scenario. The proxy will bring down the runtime of the integration when there are no requests for it after a certain threshold. This way, non-optimal service instance for one integration can be used as an optimal service instance for possibly another integration.

In accordance with an embodiment, a location of the client of integration doesn't add much to the delay, as in an integration flow instance, the client makes a single request to the integration, but the integration itself makes multiple TCP (e.g., http/ftp/sftp) requests for orchestration of applications to work.

In accordance with an embodiment, if the network latency for these multiple TCP requests are reduced then the overall performance of the integration will improve.

In accordance with an embodiment, if customer doesn't have a service instance provisioned at an identified region, then following actions can be taken:

1. A message can be shown to the user at the time of activation. The message can have details about the region where this integration will run faster. This can be done with the help of mapping geography to IP address. This will help customer decide if an integration service instance need to be provisioned at that region.

2. The integration can also be deployed in a shared service instance at the identified region and customer can be informed about this deployment. Customer can be charged a fee, each time the request is served by the shared instance. This will be like a value add.

In accordance with an embodiment, application clients can access an iPaaS system via a network, such as an internet. The iPaaS system can span multiple geographic regions, where each region is capable of hosting one or more service instances of the integration platform.

In accordance with an embodiment, upon designing and testing an integration, the system can determine an overall latency of the integration across not only a user's "home" region (or multiple home regions), but across the entire infrastructure. This latency can vary across regions, for example, due to the host location of each external application that the connectors of the integration are linked to.

In accordance with an embodiment, once the latency for the integration is determined in each geographic region, the system can run the integration in a service instance where the optimal latency is determined, with the caveat that if a global server load balancer determines that the particular region is already loaded, a next available and next optimum region can be used to run the integration. In cases where a tenant does not have a service instance within the optimum region, a shared service instance can be utilized.

In accordance with an embodiment, during activation of the integration flow, if this is determined that the flow will run faster in one of the regions where customer doesn't have a service instance provisioned then it will be asked if they want to run it from that region and if selected, then a shared service instance will be created or used for this flow in the identified region.

In accordance with an embodiment, a shared service instance is not terminated upon completion of an integration flow.

In accordance with an embodiment, if customer has service instance at identified region then runtime will be executed from this region and at times when the load is high, requests will be sent to next optimal service region of customer.

In accordance with an embodiment, generally most of the runtime for this flow will be executed from the service instance in optimal region and during this time, integration flow endpoint in other service instances in sub-optimal regions will be replaced by proxy and will not consume resources.

In accordance with an embodiment, during high load on the service instance in optimal region, load balancer can send request to customer service instance in next optimal region. At this time, proxy endpoint in service instance of sub optimal region will bring up the integration runtime for the integration flow.

In accordance with an embodiment, if there are no requests to this flow for a threshold duration, then the integration flow endpoint will be brought down and replaced by a proxy endpoint.

In accordance with an embodiment, proxy endpoints are brought down/terminated when request is sent to service instance in sub-optimal region.

Figure 4:
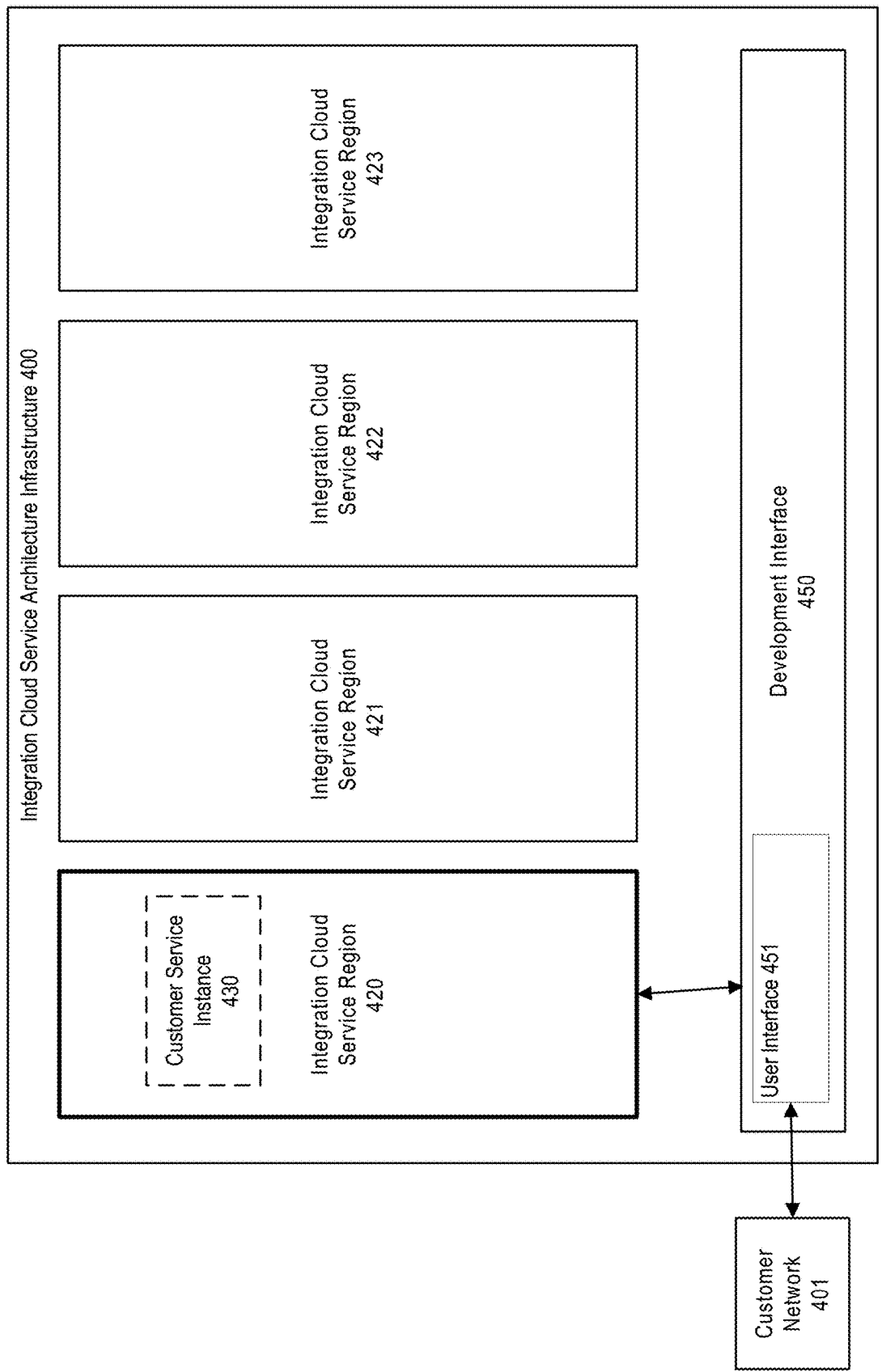
FIG. 4 shows a system for intelligent distribution of integration artifacts and runtime requests across geographic regions, in accordance with an embodiment.

FIG. 4 shows a system for intelligent distribution of integration artifacts and runtime requests across geographic regions, in accordance with an embodiment.

In accordance with an embodiment, an integration cloud service architecture infrastructure 400 can be provided that is comprised of a number of integration cloud service regions, such as regions 420, 421, 422, and 423. These service regions can span a single, or multiple geographic regions. For example, suppose the integration cloud service architecture 400 spanned North America. In such a scenario, service region 420 could be thought of as covering, or being located in, the states belonging to the Pacific Time Zone, service region 421 could be thought of as covering, or being located in, the states belonging to the Mountain Time Zone, service region 422 could be thought of as covering, or being located in, the states belonging to the Central Time Zone, and service region 423 could be thought of as covering, or being located in, the states belonging to the Eastern Time Zone. In actual practice, however, it would be better to consider regions of the integration cloud service architecture infrastructure as spanning regions around the globe.

In accordance with an embodiment, not shown, each region can comprise the hardware and software necessary to run an integration cloud service, and instances thereof, for clients and customers accessing the ICS architecture infrastructure via one of the regions.

In accordance with an embodiment, a client or customer, e.g., via a customer network, can access, via a user interface 451 (e.g., command line interface, graphical user interface, application programming interface), a development interface 450 from which a client or customer can build, test, and call for the execution of one or more integrations (as described above).

In accordance with an embodiment, while shown as being part of the integration cloud service architecture infrastructure, the development interface 450 can, instead or in addition, be accessed by the customer network at one or more specific integration cloud service regions.

In accordance with an embodiment, a customer or client can have provisioned within an integration cloud service region a customer service instance 430 of the integration cloud service. Such a customer service instance can allow the client or customer access rights and permissions to run various integrations within the systems.

In accordance with an embodiment, a region of the regions can be designated, for each client or customer, as a home region. This is shown in the figure by the bold line around region 420, signifying that service region 420 has been designated as the client or customer's home region (e.g., the region closest geographic region to the customer or client). By default, the customer or client has permission to access and utilize the resources provided by service region 420 as that is where the customer service instance 430 was provisioned. Generally, when a customer or client selects only one service region in which to have a service instance, that same region will also be the customer or client's home region.

Figure 5:
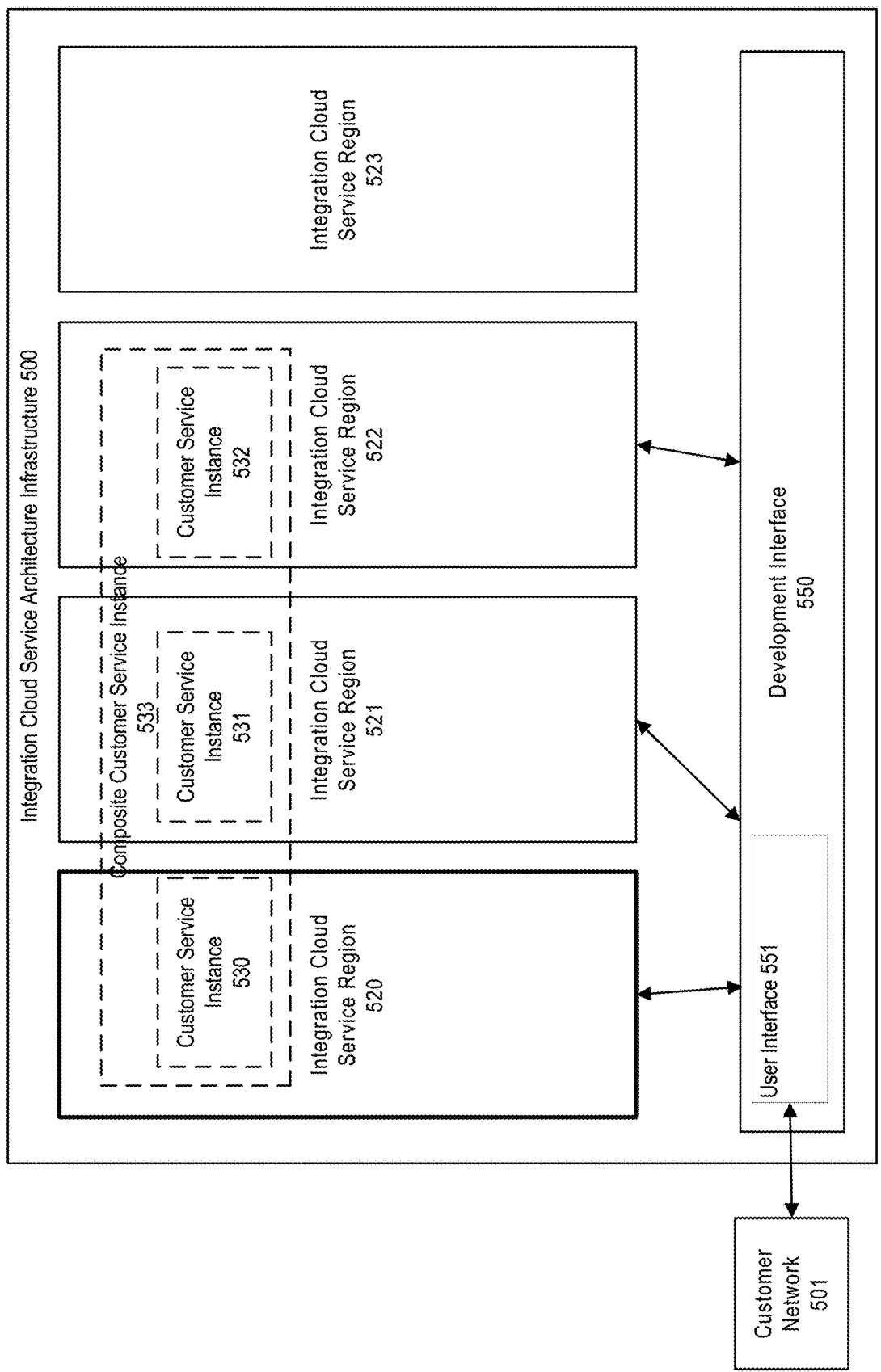
FIG. 5 shows a system for intelligent distribution of integration artifacts and runtime requests across geographic regions, in accordance with an embodiment.

FIG. 5 shows a system for intelligent distribution of integration artifacts and runtime requests across geographic regions, in accordance with an embodiment.

In accordance with an embodiment, an integration cloud service architecture infrastructure 500 can be provided that is comprised of a number of integration cloud service regions, such as regions 520, 521, 522, and 523. These service regions can span a single, or multiple geographic regions. For example, suppose the integration cloud service architecture 500 spanned North America. In such a scenario, service region 520 could be thought of as covering, or being located in, the states belonging to the Pacific Time Zone, service region 521 could be thought of as covering, or being located in, the states belonging to the Mountain Time Zone, service region 522 could be thought of as covering, or being located in, the states belonging to the Central Time Zone, and service region 523 could be thought of as covering, or being located in, the states belonging to the Eastern Time Zone. In actual practice, however, it would be better to consider regions of the integration cloud service architecture infrastructure as spanning regions around the globe.

In accordance with an embodiment, not shown, each region can comprise the hardware and software necessary to run an integration cloud service, and instances thereof, for clients and customers accessing the ICS architecture infrastructure via one of the regions.

In accordance with an embodiment, a client or customer, e.g., via a customer network, can access, via a user interface 551 (e.g., command line interface, graphical user interface, application programming interface), a development interface 550 from which a client or customer can build, test, and call for the execution of one or more integrations (as described above).

In accordance with an embodiment, while shown as being part of the integration cloud service architecture infrastructure, the development interface 550 can, instead or in addition, be accessed by the customer network at one or more specific integration cloud service regions.

In accordance with an embodiment, a customer or client can have provisioned within an integration cloud service region multiple customer service instances 530, 531, and 532 of the integration cloud service. Such customer service instances can allow the client or customer access rights and permissions to run various integrations within the systems at the service regions where the customer service instances are located.

In accordance with an embodiment, as described above, by having provisioned multiple customer service instances, a composite customer service instance 533 can be defined.

In accordance with an embodiment, a region of the regions can be designated, for each client or customer, as a home region. This is shown in the figure by the bold line around region 520, signifying that service region 520 has been designated as the client or customer's home region (e.g., the region closest geographic region to the customer or client). By default, the customer or client has permission to access and utilize the resources provided by service region 520 as that is where the customer service instances 530, 531, and 532 (the regions that the composite customer service instance spans) were provisioned.

Figure 6:
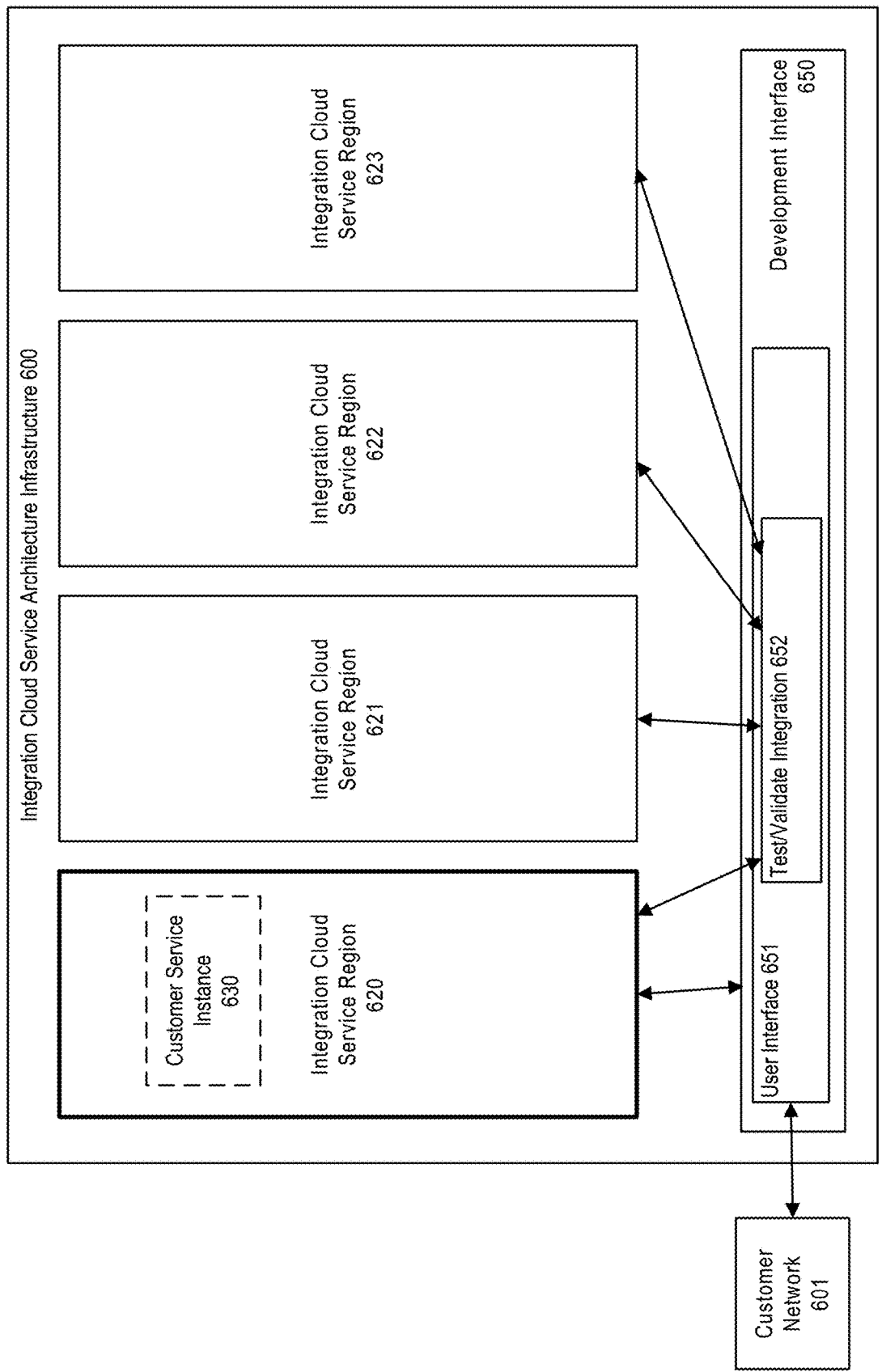
FIG. 6 shows a system for intelligent distribution of integration artifacts and runtime requests across geographic regions, in accordance with an embodiment.

FIG. 6 shows a system for intelligent distribution of integration artifacts and runtime requests across geographic regions, in accordance with an embodiment.

In accordance with an embodiment, an integration cloud service architecture infrastructure 600 can be provided that is comprised of a number of integration cloud service regions, such as regions 620, 621, 622, and 623. These service regions can span a single, or multiple geographic regions. For example, suppose the integration cloud service architecture 600 spanned North America. In such a scenario, service region 620 could be thought of as covering, or being located in, the states belonging to the Pacific Time Zone, service region 621 could be thought of as covering, or being located in, the states belonging to the Mountain Time Zone, service region 622 could be thought of as covering, or being located in, the states belonging to the Central Time Zone, and service region 623 could be thought of as covering, or being located in, the states belonging to the Eastern Time Zone. In actual practice, however, it would be better to consider regions of the integration cloud service architecture infrastructure as spanning regions around the globe.

In accordance with an embodiment, not shown, each region can comprise the hardware and software necessary to run an integration cloud service, and instances thereof, for clients and customers accessing the ICS architecture infrastructure via one of the regions.

In accordance with an embodiment, a client or customer, e.g., via a customer network, can access, via a user interface 651 (e.g., command line interface, graphical user interface, application programming interface), a development interface 650 from which a client or customer can build, test, and call for the execution of one or more integrations (as described above).

In accordance with an embodiment, while shown as being part of the integration cloud service architecture infrastructure, the development interface 650 can, instead or in addition, be accessed by the customer network at one or more specific integration cloud service regions.

In accordance with an embodiment, a customer or client can have provisioned within an integration cloud service region a customer service instance 630 of the integration cloud service. Such a customer service instance can allow the client or customer access rights and permissions to run various integrations within the systems.

In accordance with an embodiment, a region of the regions can be designated, for each client or customer, as a home region. This is shown in the figure by the bold line around region 620, signifying that service region 620 has been designated as the client or customer's home region (e.g., the region closest geographic region to the customer or client). By default, the customer or client has permission to access and utilize the resources provided by service region 620 as that is where the customer service instance 630 was provisioned. Generally, when a customer or client selects only one service region in which to have a service instance, that same region will also be the customer or client's home region.

In accordance with an embodiment, upon designing and building an integration flow, a customer or client can request that the flow (i.e., the adapter connections used in the flow) be tested or validated 652 so as to establish, e.g., the requisite metadata from the various linked external applications to build a property file for the integration flow and establish the connections within the integration flow.

In accordance with an embodiment, in addition, upon testing or validating the integration flow, the integration flow can be tested for connectivity and latency within each service region so as to determine which region provides the optimal latency for the integration flow to run. That is, for example, as the integration flow comprises a linking of a plurality of external applications, which can all be based in geographically different areas as well, the latency to each external application can differ from region to region. Connections of the flow can be tested for connectivity and latency within each service region and latency for integration in a region is calculated by adding latency of all involved connections in that region.

Figure 7:
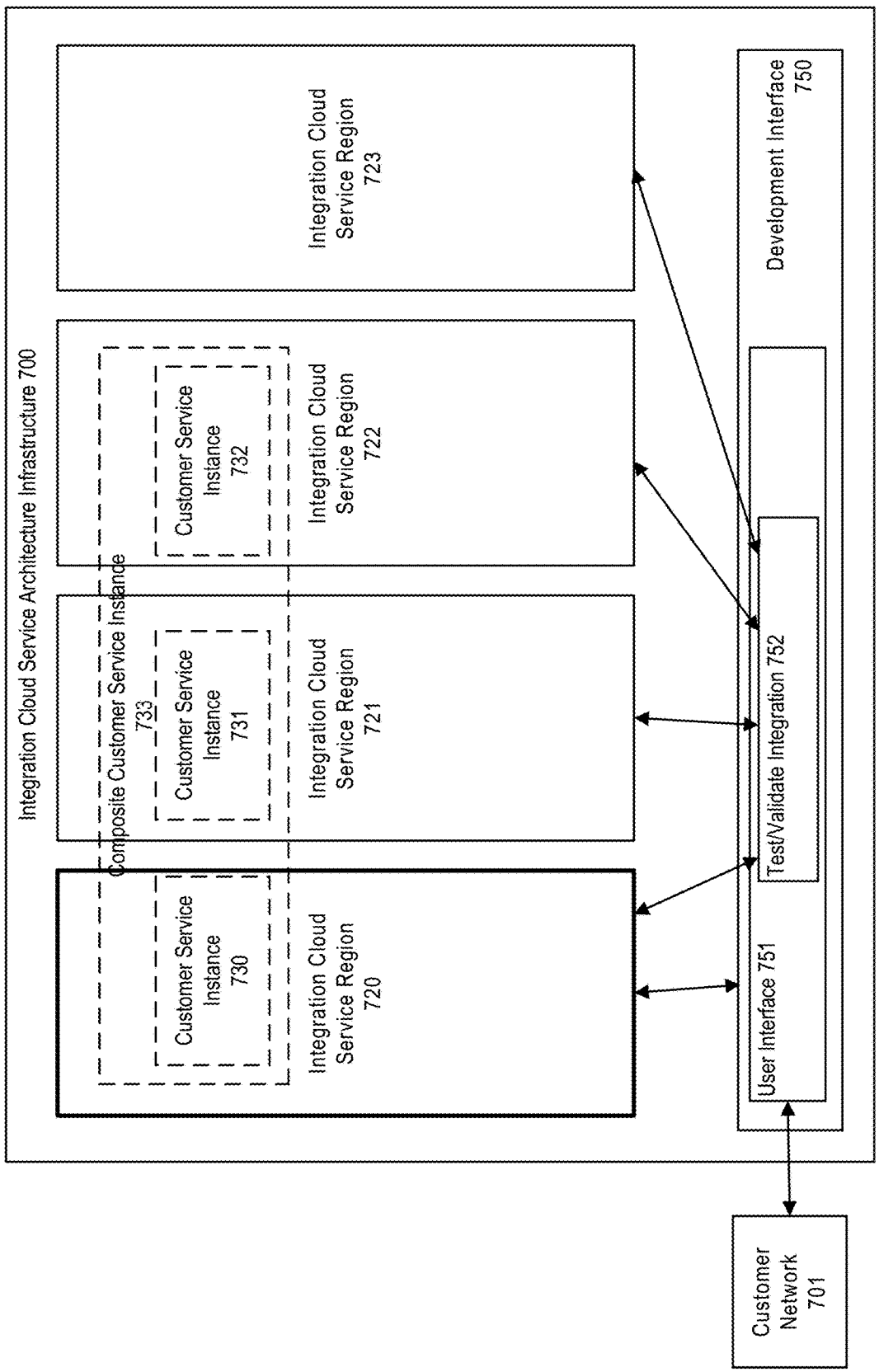
FIG. 7 shows a system for intelligent distribution of integration artifacts and runtime requests across geographic regions, in accordance with an embodiment.

FIG. 7 shows a system for intelligent distribution of integration artifacts and runtime requests across geographic regions, in accordance with an embodiment.

In accordance with an embodiment, an integration cloud service architecture infrastructure 700 can be provided that is comprised of a number of integration cloud service regions, such as regions 720, 721, 722, and 723. These service regions can span a single, or multiple geographic regions. For example, suppose the integration cloud service architecture 700 spanned North America. In such a scenario, service region 720 could be thought of as covering, or being located in, the states belonging to the Pacific Time Zone, service region 721 could be thought of as covering, or being located in, the states belonging to the Mountain Time Zone, service region 722 could be thought of as covering, or being located in, the states belonging to the Central Time Zone, and service region 723 could be thought of as covering, or being located in, the states belonging to the Eastern Time Zone. In actual practice, however, it would be better to consider regions of the integration cloud service architecture infrastructure as spanning regions around the globe.

In accordance with an embodiment, not shown, each region can comprise the hardware and software necessary to run an integration cloud service, and instances thereof, for clients and customers accessing the ICS architecture infrastructure via one of the regions.

In accordance with an embodiment, a client or customer, e.g., via a customer network, can access, via a user interface 751 (e.g., command line interface, graphical user interface, application programming interface), a development interface 750 from which a client or customer can build, test, and call for the execution of one or more integrations (as described above).

In accordance with an embodiment, while shown as being part of the integration cloud service architecture infrastructure, the development interface 750 can, instead or in addition, be accessed by the customer network at one or more specific integration cloud service regions.

In accordance with an embodiment, a customer or client can have provisioned within an integration cloud service region multiple customer service instances 730, 731, and 732 of the integration cloud service. Such customer service instances can allow the client or customer access rights and permissions to run various integrations within the systems at the service regions where the customer service instances are located.

In accordance with an embodiment, as described above, by having provisioned multiple customer service instances, a composite customer service instance 733 can be defined.

In accordance with an embodiment, a region of the regions can be designated, for each client or customer, as a home region. This is shown in the figure by the bold line around region 720, signifying that service region 720 has been designated as the client or customer's home region (e.g., the region closest geographic region to the customer or client). By default, the customer or client has permission to access and utilize the resources provided by service region 720 as that is where the customer service instances 730, 731, and 732 (the regions that the composite customer service instance spans) were provisioned.

In accordance with an embodiment, upon designing and building an integration flow, a customer or client can request that the flow be tested or validated 752 so as to establish, e.g., the requisite metadata from the various linked external applications to build a property file for the integration flow and establish the connections within the integration flow.

In accordance with an embodiment, in addition, upon testing or validating the integration flow, the integration flow can be tested for connectivity and latency within each service region so as to determine which region provides the optimal latency for the integration flow to run. That is, for example, as the integration flow comprises a linking of a plurality of external applications, which can all be based in geographically different areas as well, the latency to each external application can differ from region to region. Connections of the flow can be tested for connectivity and latency within each service region and latency for integration in a region is calculated by adding latency of all involved connections in that region.

Figure 8:
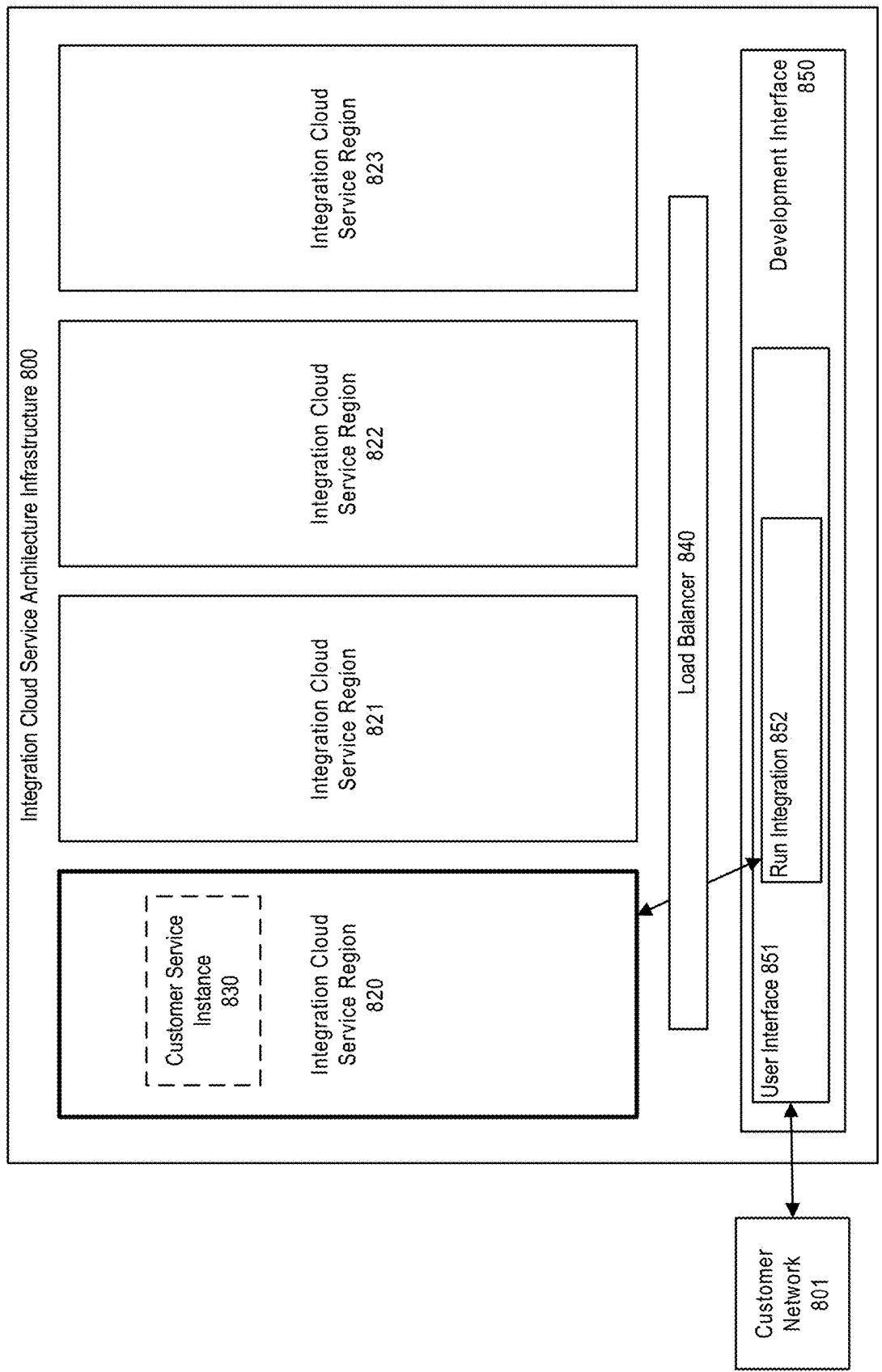
FIG. 8 shows a system for intelligent distribution of integration artifacts and runtime requests across geographic regions, in accordance with an embodiment.

FIG. 8 shows a system for intelligent distribution of integration artifacts and runtime requests across geographic regions, in accordance with an embodiment.

In accordance with an embodiment, an integration cloud service architecture infrastructure 800 can be provided that is comprised of a number of integration cloud service regions, such as regions 820, 821, 822, and 823. These service regions can span a single, or multiple geographic regions. For example, suppose the integration cloud service architecture 800 spanned North America. In such a scenario, service region 820 could be thought of as covering, or being located in, the states belonging to the Pacific Time Zone, service region 821 could be thought of as covering, or being located in, the states belonging to the Mountain Time Zone, service region 822 could be thought of as covering, or being located in, the states belonging to the Central Time Zone, and service region 823 could be thought of as covering, or being located in, the states belonging to the Eastern Time Zone. In actual practice, however, it would be better to consider regions of the integration cloud service architecture infrastructure as spanning regions around the globe.

In accordance with an embodiment, not shown, each region can comprise the hardware and software necessary to run an integration cloud service, and instances thereof, for clients and customers accessing the ICS architecture infrastructure via one of the regions.

In accordance with an embodiment, a client or customer, e.g., via a customer network, can access, via a user interface 851 (e.g., command line interface, graphical user interface, application programming interface), a development interface 850 from which a client or customer can build, test, and call for the execution of one or more integrations (as described above).

In accordance with an embodiment, while shown as being part of the integration cloud service architecture infrastructure, the development interface 850 can, instead or in addition, be accessed by the customer network at one or more specific integration cloud service regions.

In accordance with an embodiment, a customer or client can have provisioned within an integration cloud service region a customer service instance 830 of the integration cloud service. Such a customer service instance can allow the client or customer access rights and permissions to run various integrations within the systems.

In accordance with an embodiment, a region of the regions can be designated, for each client or customer, as a home region. This is shown in the figure by the bold line around region 820, signifying that service region 820 has been designated as the client or customer's home region (e.g., the region closest geographic region to the customer or client). By default, the customer or client has permission to access and utilize the resources provided by service region

820 as that is where the customer service instance 830 was provisioned. Generally, when a customer or client selects only one service region in which to have a service instance, that same region will also be the customer or client's home region.

In accordance with an embodiment, after determining the listing of overall latencies for the integration flow within each service region is determined, the integration can be run at, for example, the optimal (with respect to latency) region.

In accordance with an embodiment, as shown in FIG. 8, it has been determined that the optimal service region for the integration to be run in can be service region 820, or the customer/client's home region.

In accordance with an embodiment, prior to running the integration, a load balancer 840 can be utilized to determine whether the service region to which the integration is directed is has sufficient resources to run the integration, or whether the service region is already experiencing high load. That is, the load balancer 840 can determine whether the particular service region is already loaded. If so, a next available and next optimum region can be used to run the integration.

Figure 9:
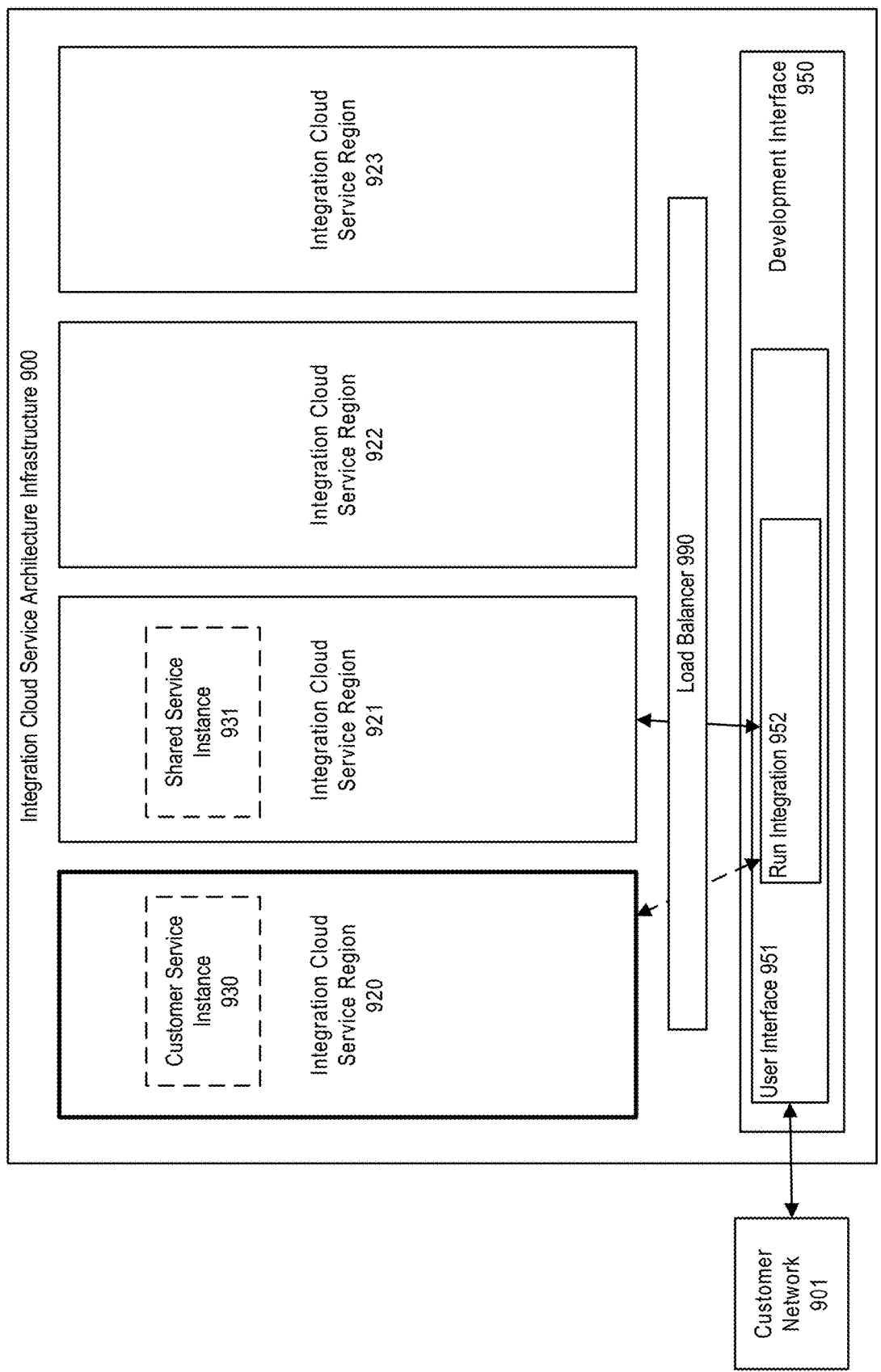
FIG. 9 shows a system for intelligent distribution of integration artifacts and runtime requests across geographic regions, in accordance with an embodiment.

FIG. 9 shows a system for intelligent distribution of integration artifacts and runtime requests across geographic regions, in accordance with an embodiment.

In accordance with an embodiment, an integration cloud service architecture infrastructure 900 can be provided that is comprised of a number of integration cloud service regions, such as regions 920, 921, 922, and 923. These service regions can span a single, or multiple geographic regions. For example, suppose the integration cloud service architecture 900 spanned North America. In such a scenario, service region 920 could be thought of as covering, or being located in, the states belonging to the Pacific Time Zone, service region 921 could be thought of as covering, or being located in, the states belonging to the Mountain Time Zone, service region 922 could be thought of as covering, or being located in, the states belonging to the Central Time Zone, and service region 923 could be thought of as covering, or being located in, the states belonging to the Eastern Time Zone. In actual practice, however, it would be better to consider regions of the integration cloud service architecture infrastructure as spanning regions around the globe.

In accordance with an embodiment, not shown, each region can comprise the hardware and software necessary to run an integration cloud service, and instances thereof, for clients and customers accessing the ICS architecture infrastructure via one of the regions.

In accordance with an embodiment, a client or customer, e.g., via a customer network, can access, via a user interface 951 (e.g., command line interface, graphical user interface, application programming interface), a development interface 950 from which a client or customer can build, test, and call for the execution of one or more integrations (as described above).

In accordance with an embodiment, while shown as being part of the integration cloud service architecture infrastructure, the development interface 950 can, instead or in addition, be accessed by the customer network at one or more specific integration cloud service regions.

In accordance with an embodiment, a customer or client can have provisioned within an integration cloud service region a customer service instance 930 of the integration cloud service. Such a customer service instance can allow the client or customer access rights and permissions to run various integrations within the systems.

In accordance with an embodiment, a region of the regions can be designated, for each client or customer, as a home region. This is shown in the figure by the bold line around region 920, signifying that service region 920 has been designated as the client or customer's home region (e.g., the region closest geographic region to the customer or client). By default, the customer or client has permission to access and utilize the resources provided by service region 920 as that is where the customer service instance 930 was provisioned. Generally, when a customer or client selects only one service region in which to have a service instance, that same region will also be the customer or client's home region.

In accordance with an embodiment, after determining the listing of overall latencies for the integration flow within each service region is determined, the integration can be run at, for example, the optimal (with respect to latency) region.

In accordance with an embodiment, as shown in FIG. 9, it has been determined that the optimal service region for the integration to be run in can be service region 920, or the customer/client's home region.

In accordance with an embodiment, prior to running the integration, a load balancer 940 can be utilized to determine whether the service region to which the integration is directed is has sufficient resources to run the integration, or whether the service region is already experiencing high load. That is, the load balancer 940 can determine whether the particular service region is already loaded. If so, a next available and next optimum region can be used to run the integration.

In accordance with an embodiment, as shown in FIG. 9, the load balance has determined that the optimal region 920 is overloaded and cannot hand the integration. In such cases, the next optimal service region can be selected, in this case, service region 921. However, because the customer/client does not have a service instance in such a region, a shared service instance 931 can be used (e.g., a runtime-only shared service instance in the optimal region. In some embodiments, the running within the shared service instance can be automatic. In other instances, an instruction indicative of a customer approval/request to run within the shared service instance 931 can be received.

In accordance with an embodiment, prior to running the integration within a shared service instance, the systems and methods can provide information, e.g., via a user-interface, to a customer indicating that a shared service instance in the optimal service region can be utilized. Such information can additionally include an indication of benefits of deployment in the deployment/activation user interface. iPaaS provider may also charge additional money to customer for this value addition.

Figure 10:
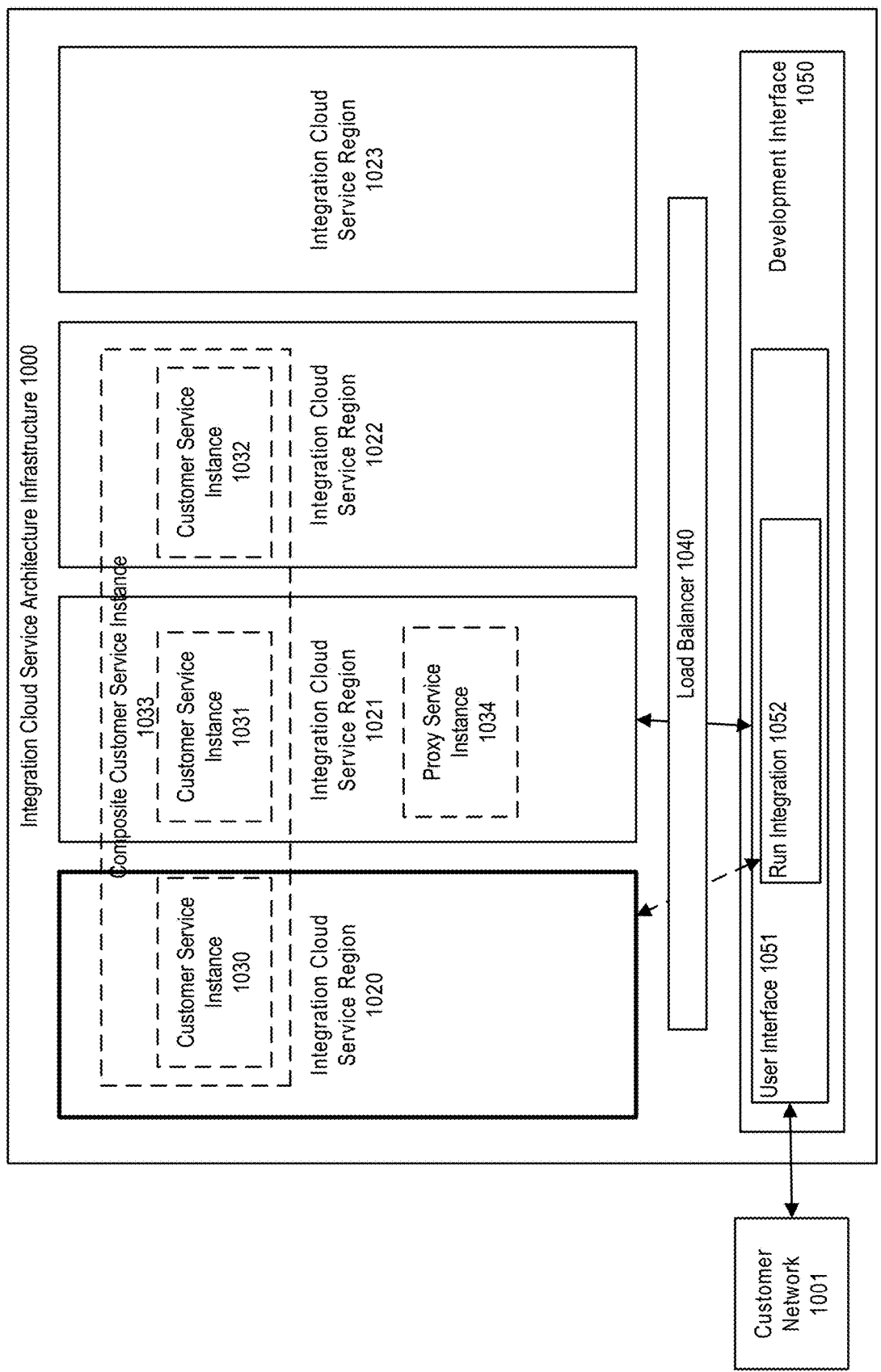
FIG. 10 shows a system for intelligent distribution of integration artifacts and runtime requests across geographic regions, in accordance with an embodiment.

FIG. 10 shows a system for intelligent distribution of integration artifacts and runtime requests across geographic regions, in accordance with an embodiment.

In accordance with an embodiment, an integration cloud service architecture infrastructure 1000 can be provided that is comprised of a number of integration cloud service regions, such as regions 1020, 1021, 1022, and 1023. These service regions can span a single, or multiple geographic regions. For example, suppose the integration cloud service architecture 1000 spanned North America. In such a scenario, service region 1020 could be thought of as covering, or being located in, the states belonging to the Pacific Time Zone, service region 1021 could be thought of as covering, or being located in, the states belonging to the Mountain Time Zone, service region 1022 could be thought of as covering, or being located in, the states belonging to the Central Time Zone, and service region 1023 could be thought of as covering, or being located in, the states belonging to the Eastern Time Zone. In actual practice, however, it would be better to consider regions of the integration cloud service architecture infrastructure as spanning regions around the globe.

In accordance with an embodiment, not shown, each region can comprise the hardware and software necessary to run an integration cloud service, and instances thereof, for clients and customers accessing the ICS architecture infrastructure via one of the regions.

In accordance with an embodiment, a client or customer, e.g., via a customer network, can access, via a user interface 1051 (e.g., command line interface, graphical user interface, application programming interface), a development interface 1050 from which a client or customer can build, test, and call for the execution of one or more integrations (as described above).

In accordance with an embodiment, while shown as being part of the integration cloud service architecture infrastructure, the development interface 1050 can, instead or in addition, be accessed by the customer network at one or more specific integration cloud service regions.

In accordance with an embodiment, a customer or client can have provisioned within an integration cloud service region multiple customer service instances 1030, 1031, and 1032 of the integration cloud service. Such customer service instances can allow the client or customer access rights and permissions to run various integrations within the systems at the service regions where the customer service instances are located.

In accordance with an embodiment, as described above, by having provisioned multiple customer service instances, a composite customer service instance 1033 can be defined.

In accordance with an embodiment, a region of the regions can be designated, for each client or customer, as a home region. This is shown in the figure by the bold line around region 1020, signifying that service region 1020 has been designated as the client or customer's home region (e.g., the region closest geographic region to the customer or client). By default, the customer or client has permission to access and utilize the resources provided by service region 1020 as that is where the customer service instances 1030, 1031, and 1032 (the regions that the composite customer service instance spans) were provisioned.

In accordance with an embodiment, connections of the flow can be tested for connectivity and latency within each service region and latency for integration in a region is calculated by adding latency of all involved connections in that region. After determining the listing of overall latencies for the integration flow within each service region is determined, the integration can be run at, for example, the optimal (with respect to latency) region.

In accordance with an embodiment, as shown in FIG. 10, it has been determined that the optimal service region for the integration to be run in can be service region 1020, or the customer/client's home region (e.g., at the customer service instanced 1030).

In accordance with an embodiment, prior to running the integration, a load balancer 1040 can be utilized to determine whether the service region to which the integration is directed is has sufficient resources to run the integration, or whether the service region is already experiencing high load. That is, the load balancer 1040 can determine whether the particular service region is already loaded. If so, a next available and next optimum region can be used to run the integration.

In accordance with an embodiment, as shown in FIG. 10, the load balancer has determined that the optimal region 1020 is overloaded and cannot handle the integration. In such cases, the next optimal service region can be selected, in this case, service region 1021. Because the customer/client's composite service region encompasses service region 1021, in addition to 1020, the integration can be seamlessly run in service region 1021 via a proxy 1034.

Figure 11:
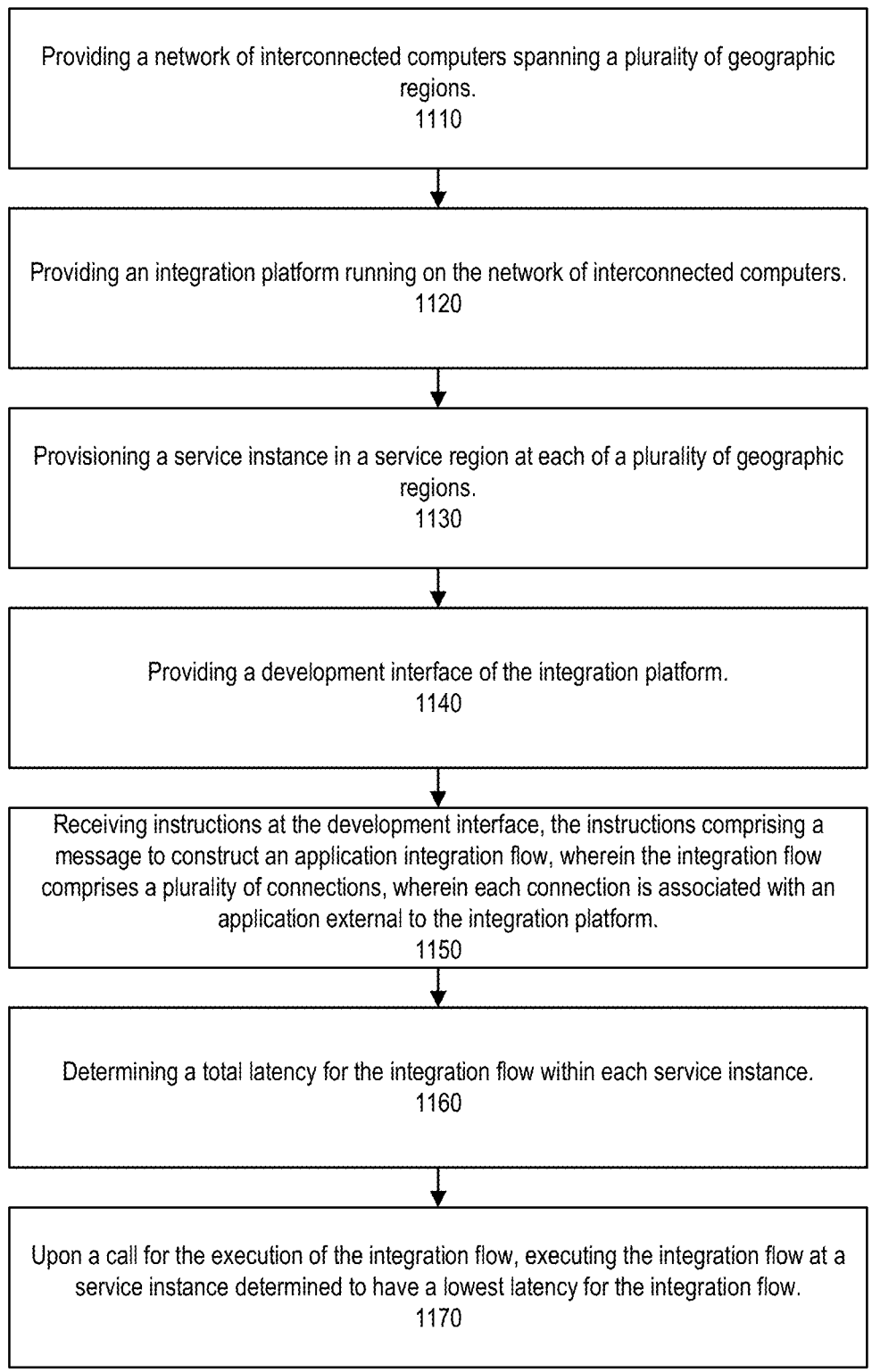
FIG. 11 is a flowchart of a method for intelligent distribution of integration artifacts and runtime requests across geographic regions, in accordance with an embodiment.

FIG. 11 is a flowchart of a method for intelligent distribution of integration artifacts and runtime requests across geographic regions, in accordance with an embodiment.

In accordance with an embodiment, at step 1110, the method can provide a network of interconnected computers spanning a plurality of geographic regions.

In accordance with an embodiment, at step 1120, the method can provide an integration platform running on the network of interconnected computers.

In accordance with an embodiment, at step 1130, the method can provision a service instance in a service region in each of a plurality of geographic regions.

In accordance with an embodiment, at step 1140, the method can provide a development interface of the integration platform.

In accordance with an embodiment, at step 1150, the method can receive instructions at the development interface, the instructions comprising a message to construct an application integration flow, wherein the integration flow comprises a plurality of connections, wherein each connection is associated with an application external to the integration platform.

In accordance with an embodiment, at step 1160, the method can determine a total latency for the integration flow within each service instance.

In accordance with an embodiment, at step 1170, the method can, upon a call for the execution of the integration flow, execute the integration flow at a service instance determined to have a lowest latency for the integration flow.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting a distribution of integration artifacts and runtime requests across geographic regions, comprising:
   a network of interconnected computers spanning a plurality of geographic regions; and
   an integration platform running on the network of interconnected computers, wherein a service instance is provisioned in a service region at each of a plurality of geographic regions;
   wherein a development interface of the integration platform is provided;
   wherein instructions are received at the development interface, the instructions comprising a message to construct an application integration flow, wherein the integration flow comprises a plurality of connections, wherein each connection is associated with an application external to the integration platform;
   wherein a total latency for the integration flow within each service instance is determined; and
   wherein upon a call for the execution of the integration flow, the integration flow is executed at a service instance determined to have a lowest latency for the integration flow.

2. The system of claim 1, further comprising
   a load balancer, wherein the load balancer determines that the service instance determined to have a lowest latency for the integration flow has a high load; and
   upon said determination, the integration flow is executed at a service instance determined to have a next lowest latency for the integration flow.

3. The system of claim 2, further comprising:
   a customer service instance defined within a service region.

4. The system of claim 3,
   wherein the service region having defined therein the customer service instance further comprises the service instance determined to have the lowest latency for the integration flow; and
   wherein the integration flow is executed within the customer service instance.

5. The system of claim 3,
   wherein the service region having defined therein the customer service instance is different from the service region comprising the service instance determined to have the lowest latency for the integration flow;

wherein the integration flow is executed within a shared runtime-only service instance at the service region comprising the service instance determined to have the lowest latency for the integration flow.

6. The system of claim 5, wherein prior to running the integration flow within the shared runtime-only service instance, an indication of an instruction to run the integration flow within the shared runtime-only service instance is received.

7. The system of claim 6, wherein determining a total latency for the integration flow within each service instance comprises:
for each provisioned service instance, determining a TCP (transmission control protocol) latency for each of the plurality of connections to each application external to the integration platform; and
based upon the determined TCP latency, determining the total latency for the integration flow within each service instance.

8. A method for supporting a distribution of integration artifacts and runtime requests across geographic regions, comprising:
providing a network of interconnected computers spanning a plurality of geographic regions; and
providing an integration platform running on the network of interconnected computers;
provisioning a service instance in a service region at each of a plurality of geographic regions;
providing a development interface of the integration platform;
receiving instructions at the development interface, the instructions comprising a message to construct an application integration flow, wherein the integration flow comprises a plurality of connections, wherein each connection is associated with an application external to the integration platform;
determining a total latency for the integration flow within each service instance; and
upon a call for the execution of the integration flow, executing the integration flow at a service instance determined to have a lowest latency for the integration flow.

9. The method of claim 8, further comprising
providing a load balancer, wherein the load balancer determines that the service instance determined to have a lowest latency for the integration flow has a high load; and
upon said determination, executing the integration flow at a service instance determined to have a next lowest latency for the integration flow.

10. The method of claim 9, further comprising:
providing a customer service instance defined within a service region.

11. The method of claim 10, wherein the service region having defined therein the customer service instance further comprises the service instance determined to have the lowest latency for the integration flow; and
wherein the integration flow is executed within the customer service instance.

12. The method of claim 10, wherein the service region having defined therein the customer service instance is different from the service region comprising the service instance determined to have the lowest latency for the integration flow;
wherein the integration flow is executed within a shared runtime-only service instance at the service region comprising the service instance determined to have the lowest latency for the integration flow.

13. The method of claim 12, wherein prior to running the integration flow within the shared runtime-only service instance, an indication of an instruction to run the integration flow within the shared runtime-only service instance is received.

14. The method of claim 13, wherein determining a total latency for the integration flow within each service instance comprises:
for each provisioned service instance, determining a TCP (transmission control protocol) latency for each of the plurality of connections to each application external to the integration platform; and
based upon the determined TCP latency, determining the total latency for the integration flow within each service instance.

15. A non-transitory computer readable storage medium, having instructions thereon for supporting a distribution of integration artifacts and runtime requests across geographic regions, which when read an executed cause a computer to perform steps comprising:
providing a network of interconnected computers spanning a plurality of geographic regions; and
providing an integration platform running on the network of interconnected computers;
provisioning a service instance in a service region at each of a plurality of geographic regions;
providing a development interface of the integration platform;
receiving instructions at the development interface, the instructions comprising a message to construct an application integration flow, wherein the integration flow comprises a plurality of connections, wherein each connection is associated with an application external to the integration platform;
determining a total latency for the integration flow within each service; and
upon a call for the execution of the integration flow, executing the integration flow at a service instance determined to have a lowest latency for the integration flow.

16. The non-transitory computer readable storage medium of claim 15, further comprising
providing a load balancer, wherein the load balancer determines that the service instance determined to have a lowest latency for the integration flow has a high load; and
upon said determination, executing the integration flow at a service instance determined to have a next lowest latency for the integration flow.

17. The non-transitory computer readable storage medium of claim 16, further comprising:
providing a customer service instance defined within a service region.

18. The non-transitory computer readable storage medium of claim 17,
wherein the service region having defined therein the customer service instance further comprises the service instance determined to have the lowest latency for the integration flow; and
wherein the integration flow is executed within the customer service instance.

19. The non-transitory computer readable storage medium of claim 17,
wherein the service region having defined therein the customer service instance is different from the service region comprising the service instance determined to have the lowest latency for the integration flow;

wherein the integration flow is executed within a shared runtime-only service instance at the service region comprising the service instance determined to have the lowest latency for the integration flow.

20. The non-transitory computer readable storage medium of claim 19, wherein prior to running the integration flow within the shared runtime-only service instance, an indication of an instruction to run the integration flow within the shared runtime-only service instance is received;

determining the total latency for the integration flow within each service region.

* * * * *

UNITED STATES PATENT AND TRADEMARK OFFICE
CERTIFICATE OF CORRECTION

PATENT NO. : 11,178,252 B1
APPLICATION NO. : 17/062454
DATED : November 16, 2021
INVENTOR(S) : Devta et al.

It is certified that error appears in the above-identified patent and that said Letters Patent is hereby corrected as shown below:

On the Title Page

On page 2, Column 2, under Other Publications, Line 6, delete "ESH," and insert -- ESB, --, therefor.

In the Drawings

On sheet 4 of 12, in Figure 3b, delete "Reques" and insert -- Request --, therefor.

In the Specification

In Column 1, Lines 51-52, delete "applications" and insert -- applications. --, therefor.

In Column 6, Line 57, delete "runtime only" and insert -- runtime-only --, therefor.

In Column 14, Line 38, delete "region." and insert -- region). --, therefor.

In Column 14, Line 45, delete "user-interface," and insert -- user interface, --, therefor.

In Column 16, Line 66, delete "(as" and insert -- as --, therefor.

In Column 17, Line 48, delete "computer-readable" and insert -- computer readable --, therefor.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*